US011217400B2

(12) United States Patent
Sugita et al.

(10) Patent No.: US 11,217,400 B2
(45) Date of Patent: Jan. 4, 2022

(54) PRESSURE-SENSITIVE SENSOR

(71) Applicant: Hitachi Metals, Ltd., Tokyo (JP)

(72) Inventors: Keisuke Sugita, Tokyo (JP); Satoru Ouchi, Tokyo (JP); Kentaro Abe, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/806,818

(22) Filed: Mar. 2, 2020

(65) Prior Publication Data

US 2020/0203091 A1 Jun. 25, 2020

Related U.S. Application Data

(62) Division of application No. 15/841,404, filed on Dec. 14, 2017, now Pat. No. 10,622,167.

(30) Foreign Application Priority Data

Dec. 28, 2016 (JP) ............................ JP2016-255343

(51) Int. Cl.

| | |
|---|---|
| ***B23P 19/00*** | (2006.01) |
| ***H01H 9/02*** | (2006.01) |
| ***H01H 11/00*** | (2006.01) |
| ***H01H 1/14*** | (2006.01) |
| ***H01H 3/14*** | (2006.01) |
| ***E05F 15/44*** | (2015.01) |
| *H01H 1/029* | (2006.01) |

(52) U.S. Cl.

CPC ............... *H01H 9/02* (2013.01); *E05F 15/44* (2015.01); *H01H 1/14* (2013.01); *H01H 3/142* (2013.01);

(Continued)

(58) Field of Classification Search

CPC ... E05F 15/44; H01H 11/00; H01H 2203/008; Y10T 29/49194; Y10T 29/5313; Y10T 29/53139; Y10T 29/532

(Continued)

(56) References Cited

U.S. PATENT DOCUMENTS

| | | | |
|---|---|---|---|
| 6,078,014 | A | 6/2000 | Kashiwazaki |
| 8,191,427 | B2 | 6/2012 | Hattori |

(Continued)

FOREIGN PATENT DOCUMENTS

| | | |
|---|---|---|
| JP | H 10-281906 A | 10/1998 |
| JP | 2000-057879 A | 2/2000 |

(Continued)

OTHER PUBLICATIONS

Office Action and Restriction Requirement in U.S. Appl. No. 15/841,404 dated Aug. 21, 2019.

(Continued)

*Primary Examiner* — Thiem D Phan

(74) *Attorney, Agent, or Firm* — McGinn I.P. Law Group, PLLC.

(57) ABSTRACT

A pressure-sensitive sensor, includes a hollow tubular member including an elastic insulating material; and n electrode wires (n being an integer of not less than 3) arranged away from one another and held inside the tubular member, wherein when an external pressure is applied to the tubular member, the tubular member elastically deforms such that at least two of the n electrode wires contact with each other, and wherein the n electrode wires extend linearly and parallel to a central axis of the tubular member.

20 Claims, 6 Drawing Sheets

(52) U.S. Cl.
CPC ............. *H01H 11/00* (2013.01); *H01H 1/029* (2013.01); *H01H 2203/008* (2013.01); *Y10T 29/49194* (2015.01); *Y10T 29/5313* (2015.01)

(58) Field of Classification Search
USPC ...... 29/729, 592.1, 593, 622, 731, 745, 756, 29/825, 846, 850, 868
See application file for complete search history.

(56) References Cited

U.S. PATENT DOCUMENTS 8,752,273 B2 * 6/2014 Miyamoto ............ E05F 15/443
29/593
2005/0092061 A1 5/2005 Takafuji et al.
2012/0222296 A1 9/2012 Miyamoto et al.

FOREIGN PATENT DOCUMENTS

JP 2005-134214 A 5/2005
JP 2012-194173 A 10/2012

OTHER PUBLICATIONS

Notice of Allowance in U.S. Appl. No. 15/841,404 dated Dec. 27, 2019.
Japanese Office Action, dated Jul. 2, 2020, in Japanese Application No. 2016-255343 and English Translation thereof.
Chinese Office Action, dated Nov. 19, 2020, in Chinese Application No. 201711354643.6 and English Translation thereof.

* cited by examiner

PRESSURE-SENSITIVE SENSOR

The present application is a Divisional Application of U.S. patent application Ser. No. 15/841,404, filed on Dec. 14, 2017, which is based on Japanese Patent Application No. 2016-255343 filed on Dec. 28, 2016, the contents of which is incorporated herein by reference in its entirety.

BACKGROUND OF THE INVENTION

1. Field of the Invention

The invention relates to a pressure-sensitive sensor and a method for manufacturing the pressure-sensitive sensor.

2. Description of the Related Art

A pressure-sensitive sensor is known which is used for vehicle sliding doors etc. and allows electrode wires thereof to contact with each other by an external pressure to provide electrical continuity to function as a switch (see e.g. JP h10/281906A and JP 2000/57879A).

JP h10/281906A discloses a pressure-sensitive sensor which is provided with a tubular elastic insulation having a hollow portion and plural electrode wires which are spaced from each other and are helically arranged on the inner peripheral wall of the hollow portion of the elastic insulation. Due to the hollow helical structure, the electrode wires can contact with each other to provide electrical continuity regardless of the directions of deformation, allowing for detection in all directions. The pressure-sensitive sensor can be manufactured such that the plural electrode wires are placed along the outer surface of a spacer having the same shape as the hollow portion, the elastic insulation is formed by extruding a rubber material around the spacer and the plural electrode wires, and the spacer is then pulled out.

JP 2000/57879A discloses a pressure-sensitive sensor which is provided with a pair of electrode wires (elastic conductors) arranged parallel on the inner peripheral surface of a tubular elastic insulation with a hollow portion so as to face each other with a space therebetween. The shape of the elastic insulation when viewed in a cross section (lateral cross section) orthogonal to the central axis of the elastic insulation is a racetrack shape (substantially oval shape) in which both widthwise ends are formed in an arc shape and flat portions are formed along the outer surface between the ends. The facing surfaces of the pair of electrode wires are flat surfaces which are parallel to the central axis of the elastic insulation as well as inclined relative to the flat portions on the outer surface of the elastic insulation. The pressure-sensitive sensor can be manufactured such that the pair of electrode wires is placed along a spacer having the same shape as the space between the pair of electrode wires so as to have a substantially oval shape as a whole, the elastic insulation is extruded on the outer periphery, and the spacer is then pulled out.

SUMMARY OF THE INVENTION

The pressure-sensitive sensor of JP h10/281906A uses a spacer and requires a step of manufacturing the spacer, a step of placing the electrode wires along the spacer and a step of pulling out the spacer, and there is a problem that the increased number of steps pushes the manufacturing cost up. In addition, when pulling out the spacer, high frictional resistance between the electrode wires and the spacer may cause the spacer to break during pulling out or the electrode wires to be damaged, e.g., scraped. Therefore, it is necessary to pull out the spacer after cutting into short lengths. This causes a problem that the spacer cannot be reused, causing an increase in the material cost, or a problem that a length of the finished pressure-sensitive sensor is limited.

The pressure-sensitive sensor of JP 2000/57879A also uses the spacer in the same manner as the above and thus has the problems of the increase in the cost and the limited length of the finished product. In addition, since the pair of electrode wires are arranged parallel to the tubular elastic insulation, the electrode wires may not contact with each other without large deformation of the elastic insulation when a direction of applied pressure coincides with an extending direction of a gap between the pair of electrode wires when viewed in a cross section orthogonal to the central axis of the elastic insulation, so that the applied pressure may cause a large decrease in sensitivity.

It is an object of the invention to provide a pressure-sensitive sensor that prevents a large decrease in sensitivity even when an external pressure is applied in the specific direction while allowing plural electrode wires to be arranged parallel to the central axis of the tubular member inside the hollow tubular member. It is also an object of the invention to provide a method for manufacturing the pressure-sensitive sensor that requires no spacer and allows a length of finished product to be freely designed.

According to an embodiment of the invention, a pressure-sensitive sensor and a method for manufacturing the pressure-sensitive sensor defined by [1] to [3] below are provided.

[1] A pressure-sensitive sensor, comprising:

a hollow tubular member comprising an elastic insulating material; and n electrode wires (n being an integer of not less than 3) arranged away from one another and held inside the tubular member, wherein when an external pressure is applied to the tubular member, the tubular member elastically deforms such that at least two of the n electrode wires contact with each other, and wherein the n electrode wires extend linearly and parallel to a central axis of the tubular member.

[2] A method for manufacturing a pressure-sensitive sensor, the sensor comprising a hollow tubular member comprising an elastic insulating material, and n electrode wires (n being an integer of not less than 3) arranged away from one another and held inside the tubular member, wherein when an external pressure is applied to the tubular member, the tubular member elastically deforms such that at least two of the n electrode wires contact with each other, the method comprising:

forming the tubular member by extruding the elastic insulating material to be the tubular member around the n electrode wires while feeding the n electrode wires linearly and parallel to each other; and injecting a compressed gas inside the tubular member.

[3] A method for manufacturing a pressure-sensitive sensor, the sensor comprising a hollow tubular member comprising an elastic insulating material, and n electrode wires (n being an integer of not less than 3) arranged away from one another and held inside the tubular member, wherein the electrode wires each comprise a metal wire and a conductive elastomer formed around the metal wire, and wherein when an external pressure is applied to the tubular member, the tubular member elastically deforms such that at least two of the n electrode wires contact with each other, the method comprising:

forming the n electrode wires and the tubular member by co-extruding the conductive elastomer around each of the n metal wires and the elastic insulating material around the electrode wires while feeding the n metal wires linearly and parallel to each other; and injecting a compressed gas inside the tubular member.

Effects of the Invention

According to an embodiment of the invention, a pressure-sensitive sensor can be provided that prevents a large decrease in sensitivity even when an external pressure is applied in the specific direction while allowing plural electrode wires to be arranged parallel to the central axis of the tubular member inside the hollow tubular member. Also, according to another embodiment of the invention, a method for manufacturing the pressure-sensitive sensor can be provided that requires no spacer and allows a length of finished product to be freely designed.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

The first embodiment of the invention will be described below in reference to FIGS. 1 to 2B. Note that, the embodiments described below are only shown as preferred examples for implementing the invention. Although some part of the embodiments specifically illustrates various technically preferable matters, the technical scope of the invention is not limited to such specific aspects.

Figure 1:
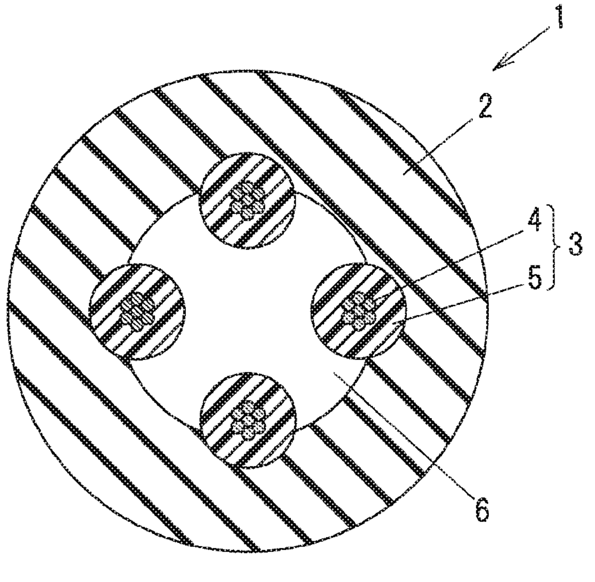
FIG. 1 is a cross sectional view showing a pressure-sensitive sensor in the first embodiment of the present invention.

FIG. 1 is a cross sectional view showing a pressure-sensitive sensor in the first embodiment of the invention. A pressure-sensitive sensor 1 is provided with a hollow tubular member 2 formed of an elastic insulating material having elasticity as well as insulating properties, and four electrode wires 3 arranged at a distance from one another and held inside the tubular member 2. Each electrode wire 3 is formed by covering a metal wire 4 with an elastic conductor 5, and the electrode wires 3 are separated by a space 6. The pressure-sensitive sensor 1 elastically deforms when the tubular member 2 is subjected to an external pressure, and at least any two of the four electrode wires 3 come into contact with each other (short-circuited). FIG. 1 shows the pressure-sensitive sensor 1 not under external pressure when viewed in a cross section orthogonal to the central axis of the tubular member 2.

Figure 2A:
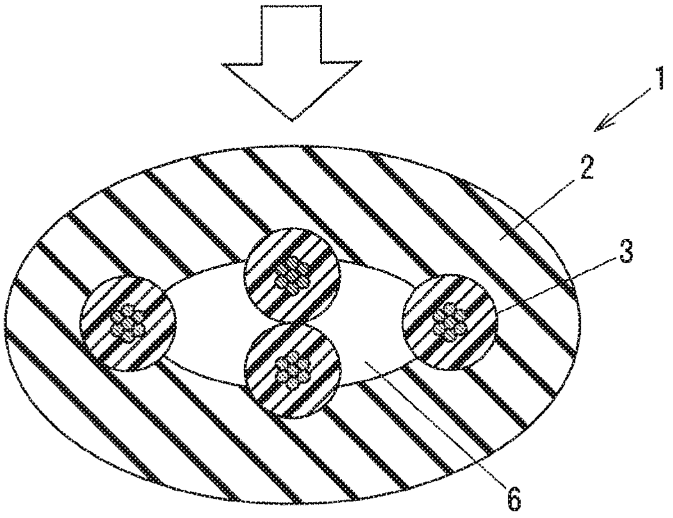
FIGS. 2A and 2B are explanatory diagrams illustrating the pressure-sensitive sensor deformed when pressure is applied in different directions from the outside of a tubular member.
Figure 2B:
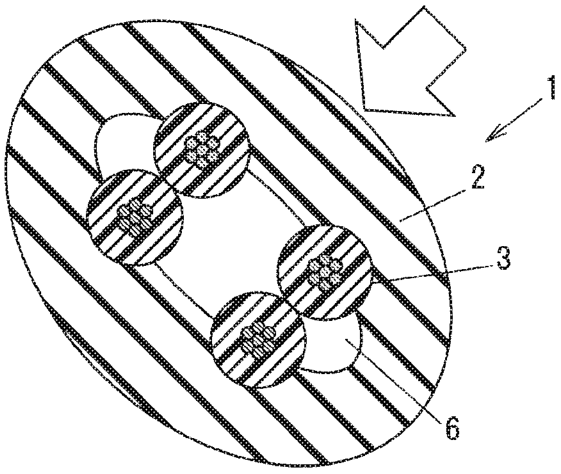

FIGS. 2A and 2B show the pressure-sensitive sensor 1 which is deformed due to pressure applied from the outside of the tubular member 2. In each of FIGS. 2A and 2B, a direction of pressure applied to the pressure-sensitive sensor 1 is indicated by an arrow. FIG. 2A shows the pressure-sensitive sensor 1 receiving pressure from above. In this state, a pair of electrode wires located on a diagonal comes into contact with each other (short-circuited). FIG. 2B shows the pressure-sensitive sensor 1 receiving pressure from right obliquely above (a direction inclined toward the right at 45° with respect to the vertical direction). In this state, two pairs of adjacent electrode wires come into contact each other (short-circuited).

As such, in the pressure-sensitive sensor 1, at least any two of the four electrode wires 3 come into contact with each other (short-circuited) under pressure in any directions.

Configuration of the Pressure-Sensitive Sensor

The tubular member 2 has a circular shape when viewed in a cross section orthogonal to the central axis, and a length of the tubular member 2 in a longitudinal direction (a direction parallel to the central axis) is not limited and is, e.g., from 1 to several tens meters depending on the intended use. The outer diameter of the tubular member 2 is, e.g., 4 mm. The tubular member 2 can be formed of a material which has small compression set and is excellent in flexibility, cold resistance, water resistance, chemical resistance and weather resistance, etc., and it is possible to favorably use, e.g., a rubber-based composition obtained by cross-linking an ethylene-propylene-diene copolymer, or a styrene-based thermoplastic elastomer composition not requiring a cross-linking process.

The electrode wires 3 extend linearly and parallel to the central axis of the tubular member 2. Each electrode wire 3 is composed of the metal wire 4 and the elastic conductor 5 covering the metal wire 4. The metal wire 4 can be, e.g., a twisted wire formed by twisting plural (seven in this example) strands of a highly conductive metal such as copper. Meanwhile, the elastic conductor 5 has elasticity and electrical conductivity. For example, a rubber-based composition obtained by cross-linking an ethylene-propylene-diene copolymer mixed with conductive fillers such as a carbon black, or a styrene-based thermoplastic elastomer composition not requiring a cross-linking process etc. can be suitably used to form the elastic conductor 5 which thus has elasticity and can deform with the tubular member 2 under an external pressure.

Method for Manufacturing the Pressure-Sensitive Sensor

Figure 6:
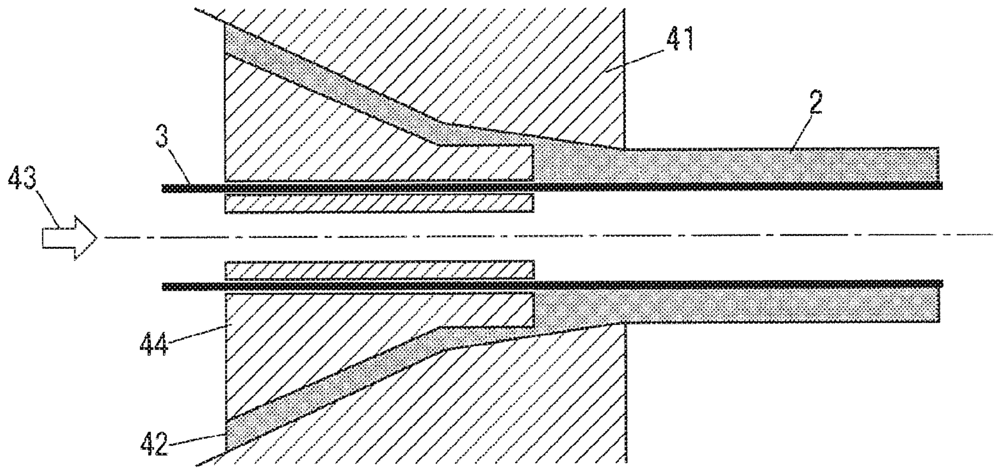
FIG. 6 is a cross section showing an extruder used to manufacture the pressure-sensitive sensor of the invention.

To obtain the pressure-sensitive sensor 1, e.g., the following two types of manufacturing method can be used. In the first manufacturing method, firstly, the electrode wires 3 are made by covering the metal wires 4 with the elastic conductors 5 using an extruder. Next, four electrode wires 3 are arranged such that the respective centers are located on the vertices of a square. Then, as shown in FIG. 6, the electrode wires 3 are fed through a crosshead of the extruder while extruding a tubular elastic insulation 42 on the outer peripheral side (from a mouthpiece 41), thereby fusing the electrode wires 3 to the inner surface of the tubular member 2. At this time, to prevent the tubular member 2, the electrode wires 3 and the space 6 from losing the shape and alignment, a compressed gas 43 is injected to apply pressure from the inside of the tubular member 2. It is possible to maintain the size or arrangement by increasing the internal pressure and the pressure-sensitive sensor 1 is thereby obtained. To arrange the electrode wires 3 on the vertices of a square, there is a method in which the electrode wires 3 are fed through four holes formed on a core bar 44 of the extruder. Meanwhile, to inject the compressed gas 43 to apply pressure from the inside, there is a method in which one or plural holes are formed at, e.g., the center of the core bar 44 and the compressed gas 43 is supplied from the inner side of the core bar 44 toward an outlet. Suitable compressed gas 43 is the air or an inert gas such as nitrogen.

In the second manufacturing method, the electrode wires 3 are formed by extruding the elastic conductors 5 around the metal wires 4 which are arranged such that the respective centers are located on the vertices of a square, and simultaneously, the tubular elastic insulation 42 is extruded from the outer peripheral side, thereby fusing the electrode wires 3 to the inner surface of the tubular member 2. A common co-extrusion technique is used for the simultaneous extrusion. In addition, to prevent the tubular member 2, the electrode wires 3 and the space 6 from losing the shape and alignment, the compressed gas 43 is injected to apply pressure from the inside of the tubular member 2, in the same manner as in the first manufacturing method. It is possible to maintain the size or arrangement by increasing the internal pressure and the pressure-sensitive sensor 1 is thereby obtained.

Effects of the First Embodiment

In the first embodiment, since the electrode wires 3 are arranged linearly and parallel to the central axis of the tubular member 2 and are also fused to the inner surface of the tubular member 2 by injecting the compressed gas to apply pressure from the inside of the tubular member 2 during manufacturing of the pressure-sensitive sensor 1, it is not necessary to provide any spacer and it is possible to freely design the length of the finished pressure-sensitive sensor 1. In addition, since four electrode wires 3 are provided, sensitivity of the pressure-sensitive sensor 1 to pressure does not greatly decrease in any specific direction, which means that it is possible to detect pressure in any directions. Although the electrode wires 3 are arranged to be located on the vertices of a square in the configuration of the example described above, the configuration may be such that the electrode wires 3 are arranged to be located on the vertices of a regular n-sided polygon (n being an integer of not less than 3).

Other Embodiments

Figure 4:
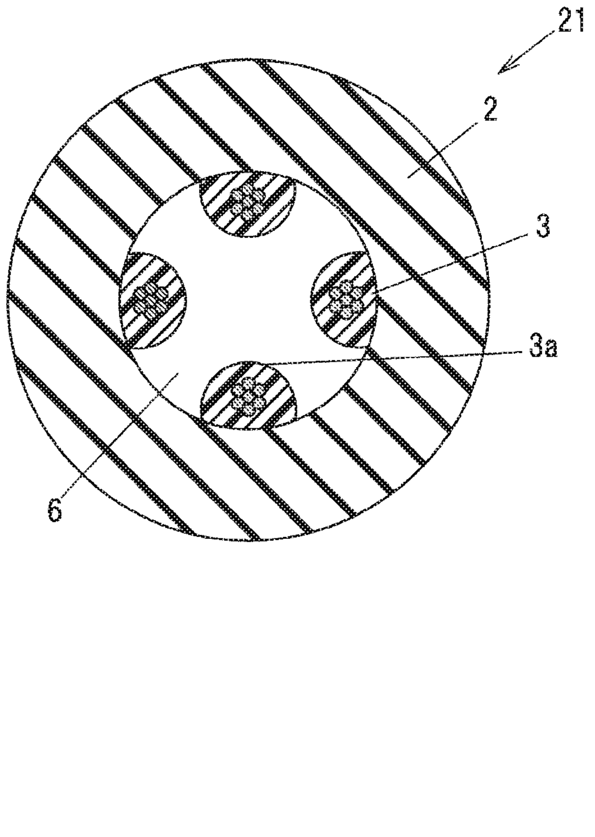
FIG. 4 is a cross sectional view showing a pressure-sensitive sensor in the third embodiment of the invention.
Figure 5:
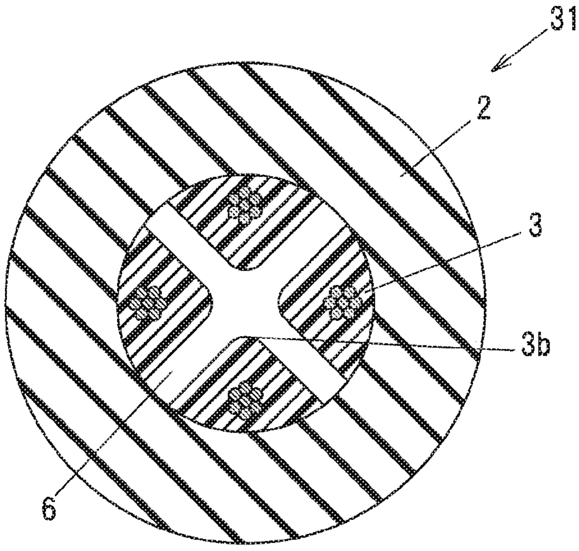
FIG. 5 is a cross sectional view showing a pressure-sensitive sensor in the fourth embodiment of the invention.

Next, other embodiments of the invention will be described in reference to FIGS. 3 to 5.

Figure 3:
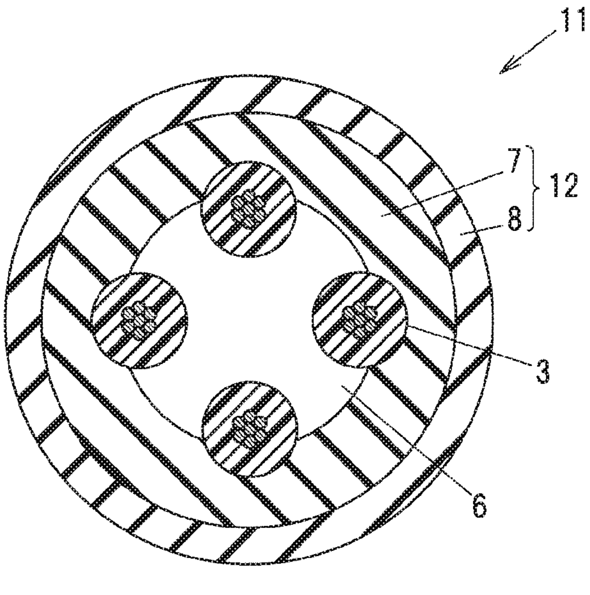
FIG. 3 is a cross sectional view showing a pressure-sensitive sensor in the second embodiment of the invention.

FIG. 3 is a cross sectional view showing a pressure-sensitive sensor 11 in the second embodiment of the invention. FIG. 4 is a cross sectional view showing a pressure-sensitive sensor 21 in the third embodiment of the invention. FIG. 5 is a cross sectional view showing a pressure-sensitive sensor 31 in the fourth embodiment of the invention.

Each of the pressure-sensitive sensors 11, 21 and 31 in the second to fourth embodiments is provided with a tubular member 2 or 12 and four electrode wires 3 each formed by covering the metal wire 4 with the elastic conductor 5 and extending linearly and parallel to the central axis inside the tubular member 2 or 12 in the same manner as the pressure-sensitive sensor 1 in the first embodiment, but the configuration of the tubular member or the cross-sectional shape of the electrode wire 3 is different from the first embodiment. FIGS. 3 to 5 respectively show the pressure-sensitive sensors 11, 21 and 31 in the cross sections orthogonal to the tubular members 2 or 12.

Next, the respective configurations of the pressure-sensitive sensors 11, 21 and 31 will be described in detail.

The tubular member 12 of the pressure-sensitive sensor 11 in the second embodiment has a two-layer structure and is composed of an inner tubular member 7 and an outer tubular member 8. Providing the outer tubular member 8 in the tubular member 12 is effective particularly to increase strength of pressure-sensitive sensor or to enhance compatibility (adhesion, etc.) with other members (e.g., sealing members at end portions or a portion for attaching the pressure-sensitive sensor, etc.). Both the inner tubular member 7 and the outer tubular member 8 can be formed of an elastic insulating material. To form the inner tubular member 7, it is possible to use the same material as that used to form the tubular member 2 of the pressure-sensitive sensor 1. Meanwhile, to form the outer tubular member 8, it is possible to use, e.g., a thermoplastic urethane which is excellent in strength and abrasion resistance and has good adhesion to polyamide which is often used to form other members. To manufacture the pressure-sensitive sensor 11, it is possible to employ a method in which the structure covered with the inner tubular member 7 is manufactured by the same method as that used to manufacture the pressure-sensitive sensor 1 in the first embodiment and the outer tubular member 8 is then extruded as the outermost layer, or a method in which two layers, the inner tubular member 7 and the outer tubular member 8, are co-extruded instead of the process of extruding the tubular member 2 in manufacturing of the pressure-sensitive sensor 1 in the first embodiment.

The pressure-sensitive sensors 21 and 31 in the third and fourth embodiments are configured that a hollow portion of the tubular member 2 has a circular shape in a cross section and the electrode wires 3 are formed along the inner surface of the hollow portion. In the pressure-sensitive sensor 21, the cross-sectional shape of the electrode wire 3 is substantially a semicircle, such that an arc portion 3*a* faces toward the central axis of the tubular member 2. In the pressure-sensitive sensor 31, the cross-sectional shape of the electrode wire 3 is substantially a triangle, such that one of vertex portions 3*b* faces toward the central axis of the tubular member 2. Since the cross-sectional shape of the electrode wire 3 is asymmetrical, a suitable manufacturing method is a method in which the electrode wires 3 are formed by extruding the elastic conductors 5 around the metal wires 4, and simultaneously, a tubular elastic insulating material is extruded from the outer peripheral side such that the electrode wires 3 are fused to the inner surface of the tubular member 2 and the positions thereof are fixed.

Also for the pressure-sensitive sensors 11, 21 and 31 in the second to fourth embodiments, it is not necessary to provide any spacer, it is possible to freely design the length of the finished pressure-sensitive sensors 11, 21 and 31, and sensitivity of the pressure-sensitive sensors 11, 21 and 31 to pressure does not greatly decrease in any specific direction, which means that it is possible to detect pressure in any directions, in the same manner as the pressure-sensitive sensor 1 in the first embodiment.

Technical ideas understood from the embodiments will be described below citing the reference numerals, etc., used for the embodiments. However, each reference numeral described below is not intended to limit the constituent elements in the claims to the members, etc., specifically described in the embodiments.

[1] A pressure-sensitive sensor (1, 11, 21, 31), comprising: a hollow tubular member (2, 12) comprising an elastic insulating material (42); and n electrode wires (3) (n being an integer of not less than 3) arranged away from one another and held inside the tubular member (2, 12), wherein when an external pressure is applied to the tubular member (2, 12), the tubular member (2, 12) elastically deforms such that at least two of the n electrode wires (3) contact with each other, and wherein the n electrode wires (3) extend linearly and parallel to a central axis of the tubular member (2, 12).

[2] A method for manufacturing a pressure-sensitive sensor (1, 11, 21, 31), the sensor (1, 11, 21, 31) comprising a hollow tubular member (2, 12) comprising an elastic insulating material (42), and n electrode wires (3) (n being an integer of not less than 3) arranged away from one another and held inside the tubular member (2, 12), wherein an external pressure is applied to the tubular member (2, 12), the tubular member (2, 12) elastically deforms such that at least two of the n electrode wires (3) contact with each other, the method comprising: forming the tubular member (2, 12) by extruding the elastic insulating material (42) to be the tubular member (2, 12) around the n electrode wires (3) while feeding the n electrode wires (3) linearly and parallel to each other; and injecting a compressed gas (43) inside the tubular member (2, 12).

[3] A method for manufacturing a pressure-sensitive sensor (1, 11, 21, 31), the sensor (1, 11, 21, 31) comprising a hollow tubular member (2, 12) comprising an elastic insulating material (42), and n electrode wires (3) (n being an integer of not less than 3) arranged away from one another and held inside the tubular member (2, 12), wherein the electrode wires (3) each comprise a metal wire (4) and a conductive elastomer (5) formed around the metal wire (4), and wherein when an external pressure is applied to the tubular member (2, 12), the tubular member (2, 12) elastically deforms such that at least two of the n electrode wires (3) contact with each other, and the method comprising: forming the n electrode wires (3) and the tubular member (2, 12) by co-extruding the conductive elastomers (5) around each of the n metal wires (4) and the elastic insulating material (42) around the electrode wires (3) while feeding the n metal wires (4) linearly and parallel to each other; and injecting a compressed gas (43) inside the tubular member (2, 12).

Although the embodiments of the invention have been described, the invention according to claims is not to be limited to the embodiments. Further, please note that all combinations of the features described in the embodiments are not necessary to solve the problem of the invention. The invention can be appropriately modified and implemented without departing from the gist thereof.

What is claimed is:

1. A pressure-sensitive sensor, comprising:
- a hollow tubular member comprising an elastic insulating material; and
- n electrode wires (n being an integer of not less than 3) arranged away from one another and held inside the tubular member,
- wherein when an external pressure is applied to the tubular member, the tubular member elastically deforms such that at least two of the n electrode wires contact with each other,
- wherein the n electrode wires extend linearly and parallel to a central axis of the tubular member, and
- wherein in a transversal cross-sectional view; each surface connecting between adjacent electrode wires comprises an arc shape.

2. The pressure-sensitive sensor according to claim 1, wherein each of the n electrode wires is partially embedded in the hollow tubular member.

3. The pressure-sensitive sensor according to claim 2, wherein the n electrode wires are free of damage due to scraping.

4. The pressure-sensitive sensor according to claim 2, wherein, in the transversal cross-sectional view, said each surface connecting between the adjacent electrode wires comprises a continuous curved shape.

5. The pressure-sensitive sensor according to claim 2, wherein each of the n electrode wires is partially embedded in the tubular member by an internal pressure applied to an internal space of the tubular member.

6. The pressure-sensitive sensor according to claim 5, wherein the internal pressure comprises a compressed gas injected into an internal space of the tubular member.

7. The pressure-sensitive sensor according to claim 2, wherein each of the n electrode wires is fused to an inner surface of the tubular member by an internal pressure applied to an internal space of the tubular member.

8. The pressure-sensitive sensor according to claim 7, wherein the internal pressure comprises a compressed gas injected into an internal space of the tubular member.

9. The pressure-sensitive sensor according to claim 2, wherein the tubular member deforms such that the at least two of the n electrode wires contact with each other, when external pressure is applied to the tubular member from any direction.

10. The pressure-sensitive sensor according to claim 2, wherein the elastic insulating material comprises a rubber-based composition obtained by cross-linking ethylene-propylene-diene copolymer mixed with a conductive filler.

11. The pressure-sensitive sensor according to claim 2, wherein the elastic insulating material comprises a ene-based thermoplastic elastomer composition.

12. The pressure-sensitive sensor according to claim 1, wherein the n electrode wires are free of damage due to scraping.

13. The pressure-sensitive sensor according to claim 1, wherein, in the transversal cross-sectional view, said each surface connecting between the adjacent electrode wires comprises a continuous curved shape.

14. The pressure-sensitive sensor according to claim 1, wherein each of the n electrode wires is partially embedded in the tubular member by an internal pressure applied to an internal space of the tubular member.

15. The pressure-sensitive sensor according to claim 14, wherein the internal pressure comprises a compressed gas injected into an internal space of the tubular member.

16. The pressure-sensitive sensor according to claim 1, wherein each of the n electrode wires is fused to an inner surface of the tubular member by an internal pressure applied to an internal space of the tubular member.

17. The pressure-sensitive sensor according to claim 16, wherein the internal pressure comprises a compressed gas injected into an internal space of the tubular member.

18. The pressure-sensitive sensor according to claim 1, wherein the tubular member deforms such that the at least two of the n electrode wires contact with each other, when external pressure is applied to the tubular member from any direction.

19. The pressure-sensitive sensor according to claim 1, wherein the elastic insulating material comprises a rubber-based composition obtained by cross-linking ethylene-propylene-diene copolymer mixed with a conductive filler.

20. The pressure-sensitive sensor according to claim 1, wherein the elastic insulating material comprises a styrene-based thermoplastic elastomer composition.

* * * * *